(12) United States Patent
Kang et al.

(10) Patent No.: US 9,134,822 B2
(45) Date of Patent: Sep. 15, 2015

(54) DOT PATTERN RECOGNIZING DEVICE AND CONTENT EXECUTING DEVICE

(71) Applicant: PEN GENERATIONS INC., Seongnam-si, Gyeonggi-do (KR)

(72) Inventors: Yong Hoon Kang, Seongnam-si (KR); Young Soo Jung, Seongnam-si (KR); Young Ho Choi, Seongnam-si (KR)

(73) Assignee: PEN GENERATIONS INC., Gyeonggi-do (KR)

( * ) Notice: Subject to any disclaimer, the term of this patent is extended or adjusted under 35 U.S.C. 154(b) by 0 days.

(21) Appl. No.: 14/509,178

(22) Filed: Oct. 8, 2014

(65) Prior Publication Data

US 2015/0227218 A1  Aug. 13, 2015

(30) Foreign Application Priority Data

Feb. 13, 2014 (KR) ........................ 10-2014-0016810

(51) Int. Cl.
*G06F 3/0354* (2013.01)
*G06F 3/03* (2006.01)

(52) U.S. Cl.
CPC .......... *G06F 3/03545* (2013.01); *G06F 3/0317* (2013.01)

(58) Field of Classification Search
CPC ....................................... G06F 3/0317–3/0321
USPC ...................... 178/18.09, 19.05; 345/179–183
See application file for complete search history.

(56) References Cited

FOREIGN PATENT DOCUMENTS

| JP | 3174897 U | 3/2012 |
|---|---|---|
| JP | 2012-164192 A | 8/2012 |
| KR | 1020090129215 A | 12/2009 |
| KR | 1020120029025 A | 3/2012 |

OTHER PUBLICATIONS

First Korean Office Action dated Mar. 20, 2014; Appln. No. 10-2014-0016810.
Korean Notice of Rejection dated May 29, 2014; Appln. No. 10-2014-0016810.
Korean Notice of Decision to Grant Patent dated Jul. 15, 2014; Appln. No. 10-2014-0016810.

*Primary Examiner* — Michael Pervan
(74) *Attorney, Agent, or Firm* — Ladas & Parry LLP

(57) ABSTRACT

Disclosed is a device for recognizing a dot pattern, including: a dot pattern recognizing unit configured to recognize a first dot pattern and a second dot pattern on a recording medium, on which a dot pattern is formed; a location information extracting unit configured to extract first location information from the first dot pattern, and extract second location information from the second dot pattern; a communication unit configured to transmit the first location information and the second location information to the content executing device; and a controller configured to control the dot pattern recognizing unit, the location information extracting unit, and the communication unit, in which the first dot pattern is a dot pattern recognized when the device is spaced apart from the recording medium, and the second dot pattern is a dot pattern recognized when the device is in contact with the recording medium.

8 Claims, 9 Drawing Sheets

DOT PATTERN RECOGNIZING DEVICE AND CONTENT EXECUTING DEVICE

TECHNICAL FIELD

The present invention relates to dot pattern recognition, and more particularly, to a dot pattern recognizing device, and a content executing device linked therewith.

BACKGROUND ART

A dot pattern has a characteristic of indicating a unique location. The unique location may be associated with specific contents or a specific function. Accordingly, interest in technology of linking a dot pattern recognizing device and contents and applying the dot pattern has increased.

In general, the dot pattern recognizing device recognizes a dot pattern, extracts location information from the recognized dot pattern, maps the extracted location information with specific contents or a specific function, and outputs the mapped contents or function. The dot pattern recognizing device has a complex configuration, and has high cost.

Accordingly, there is an attempt to insert only a function of recognizing a dot pattern and extracting location information from the recognized dot pattern into the dot pattern recognizing device. The dot pattern recognizing device transmits the extracted location information to an external device, and the external device maps the received location information with specific contents or a specific function, and outputs the mapped contents or function. The dot pattern recognizing device has a simple configuration, and has low cost, but has a problem in that a reaction rate is low.

SUMMARY OF THE INVENTION

The present invention has been made in an effort to provide a dot pattern recognizing device, and a content executing device linked therewith.

An exemplary embodiment of the present invention provides a device for recognizing a dot pattern, including: a dot pattern recognizing unit configured to recognize a first dot pattern and a second dot pattern on a recording medium, on which a dot pattern is formed; a location information extracting unit configured to extract first location information from the first dot pattern, and extract second location information from the second dot pattern; a communication unit configured to transmit the first location information and the second location information to a content executing device; and a controller configured to control the dot pattern recognizing unit, the location information extracting unit, and the communication unit, in which the first dot pattern is a dot pattern recognized when the device is spaced apart from the recording medium, and the second dot pattern is a dot pattern recognized when the device is in contact with the recording medium.

The device may further include a recognition mode setting unit configured to set the device so that the device is operated in at least one of a first recognition mode set to recognize only the second dot pattern and a second recognition mode set to recognize the first dot pattern and the second dot pattern.

Another exemplary embodiment of the present invention provides a device for executing contents, including: a communication unit configured to sequentially receive first location information and second location information extracted from a first dot pattern and a second dot pattern, respectively, recognized on a recording medium, on which a dot pattern is formed; a controller configured to execute functions corresponding to the first location information and the second location information, and an output unit configured to output an executed function, in which the first dot pattern is a dot pattern recognized in the state where the device is spaced apart from the recording medium, and the second dot pattern is recognized in the state where the device is in contact with the recording medium.

The first location information and the second location information may correspond to the same function.

The first location information and the second location information may correspond to the different functions.

The recording medium may include a plurality of regions divided in parallel, and a plurality of functions may be allocated to each region.

When the first location information for a predetermined region is received from the dot pattern recognizing device, the device for executing the contents may execute the plurality of functions allocated to the predetermined region.

When the second location information for a predetermined region is received from the dot pattern recognizing device, the device for executing the contents may execute the plurality of functions allocated to the predetermined region.

When the first location information for a predetermined region is received from the dot pattern recognizing device, the device for executing the contents may execute at least some of the plurality of functions allocated to the predetermined region, and when the second location information for the predetermined region is received, the device for executing the contents may execute the rest of the plurality of functions allocated to the predetermined region.

Yet another exemplary embodiment of the present invention provides a system for executing contents, including: a dot pattern recognizing device configured to recognize a first dot pattern and a second dot pattern on a recording medium, on which a dot pattern is formed, extract first location information from the first dot pattern, extract second location information from the second dot pattern, and transmit the first location information and the second location information, and a content executing device configured to sequentially receive the first location information and the second location information from the dot pattern recognizing device, and execute functions corresponding to the first location information and the second location information, in which the first dot pattern is a dot pattern recognized in the state where the device is spaced apart from the recording medium, and the second dot pattern is a dot pattern recognized in the state where the device is in contact with the recording medium.

According to the exemplary embodiment of the present invention, it is possible to obtain the dot pattern recognizing device having a simple configuration, low cost, and a high reaction rate. Particularly, the dot pattern recognizing device recognizes the dot pattern in stages, so that a rate of extracting contents or a function mapped to location information becomes high, and it is possible to simultaneously perform various functions.

DETAILED DESCRIPTION

Figure 1:
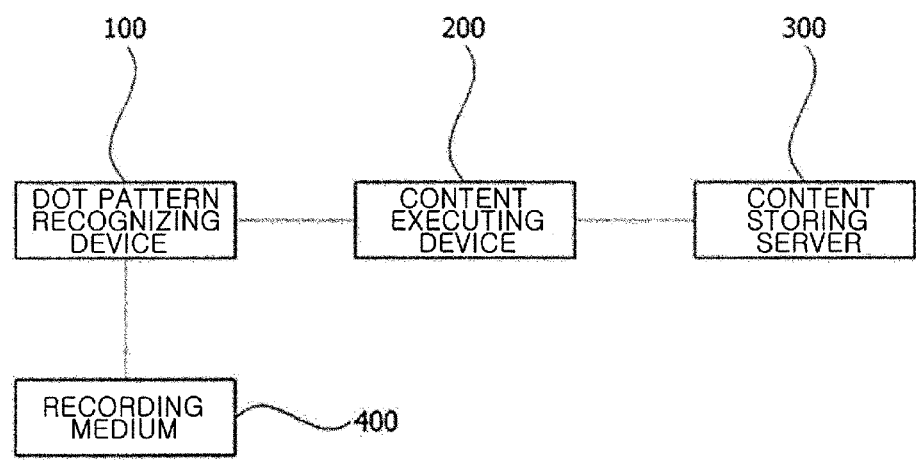
FIG. 1 is a block diagram illustrating a content executing system according to an exemplary embodiment of the present invention.

The present invention may have various modifications and exemplary embodiments and thus specific exemplary embodiments will be illustrated in the drawings and described. However, it is not intended to limit the present invention to the specific exemplary embodiments, and it will be appreciated that the present invention includes all modifications, equivalences, or substitutions included in the spirit and the technical scope of the present invention.

Terms including an ordinary number, such as first and second, are used for describing various constituent elements, but the constituent elements are not limited by the terms. The terms are used only to, discriminate one constituent element from another constituent element. For example, without departing from the scope of the invention, a first constituent element may be named as a second constituent element, and similarly a second constituent element may be named as a first constituent element. A term "and/or" includes a combination of multiple relevant described items or any one of the multiple relevant described items.

It should be understood that when one constituent element is referred to as being "coupled to" or "connected to" another constituent element, one constituent element can be directly coupled to or connected to the other constituent element, but intervening elements may also be present. By contrast, when one constituent element is referred to as being "directly coupled to" or "directly connected to" another constituent element, it should be understood that there are no intervening elements.

Terms used in the present application are used only to describe specific exemplary embodiments, and are not intended to limit the present invention. Singular expressions used herein include plurals expressions unless they have definitely opposite meanings in the context. In the present application, it will be appreciated that terms "including" and "having" are intended to designate the existence of characteristics, numbers, steps, operations, constituent elements, and components described in the specification or a combination thereof, and do not exclude a possibility of the existence or addition of one or more other characteristics, numbers, steps, operations, constituent elements, and components, or a combination thereof in advance.

All terms used herein including technical or scientific terms have the same meanings as meanings which are generally understood by those skilled in the art unless they are differently defined. Terms defined in generally used dictionary shall be construed that they have meanings matching those in the context of a related art, and shall not be construed in ideal or excessively formal meanings unless they are clearly defined in the present application.

Hereinafter, exemplary embodiments according to the present invention will be described in detail with reference to the accompanying drawings, and the same or corresponding constituent elements are denoted by the same reference numerals regardless of a sign of the drawing, and repeated description thereof will be omitted.

FIG. 1 is a block diagram illustrating a content executing system according to an exemplary embodiment of the present invention.

Referring to FIG. 1, a content executing system includes a dot pattern recognizing device 100, a content executing device 200, and a content storing server 300.

The dot pattern recognizing device 100 recognizes a dot pattern on a recording medium 400, on which the dot pattern is formed, extracts location information from the recognized dot pattern, and transmits the extracted location information to the content executing device 200. Here, the recording medium 400, on which the dot pattern is formed, may include, for example, a printout including a printed dot pattern, an electronic bulletin board, and a display device on which a dot pattern is formed.

The content executing device 200 executes contents corresponding to the location information received from the dot pattern recognizing device 100.

To this end, the content executing device 200 may pre-store location information and content information associated with the location information. The content information may include, for example, identification information for identifying contents. The content executing device 200 may extract content information associated with the location information, and transmit the extracted content information to the content storing server 300. Further, the content executing device 200 may execute the contents received from the content storing server 300.

In the meantime, the content executing device 200 may pre-store contents, and execute the stored contents in connection with the location information received from the dot pattern recognizing device 100.

The content executing device 200 may not extract the content information from the location information received from the dot pattern recognizing device 100, and may transmit the location information to the content storing server 300, and execute the contents received from the content storing server 300.

The content storing server 300 stores a plurality of contents, and transmits contents requested from the content executing device 200 to the content executing device 200. Here, the contents may be multimedia contents including audio, a video, and an image. The content storing server 300 is remotely located, and may communicate with the content executing device 200 by wire or wirelessly.

Figure 2:
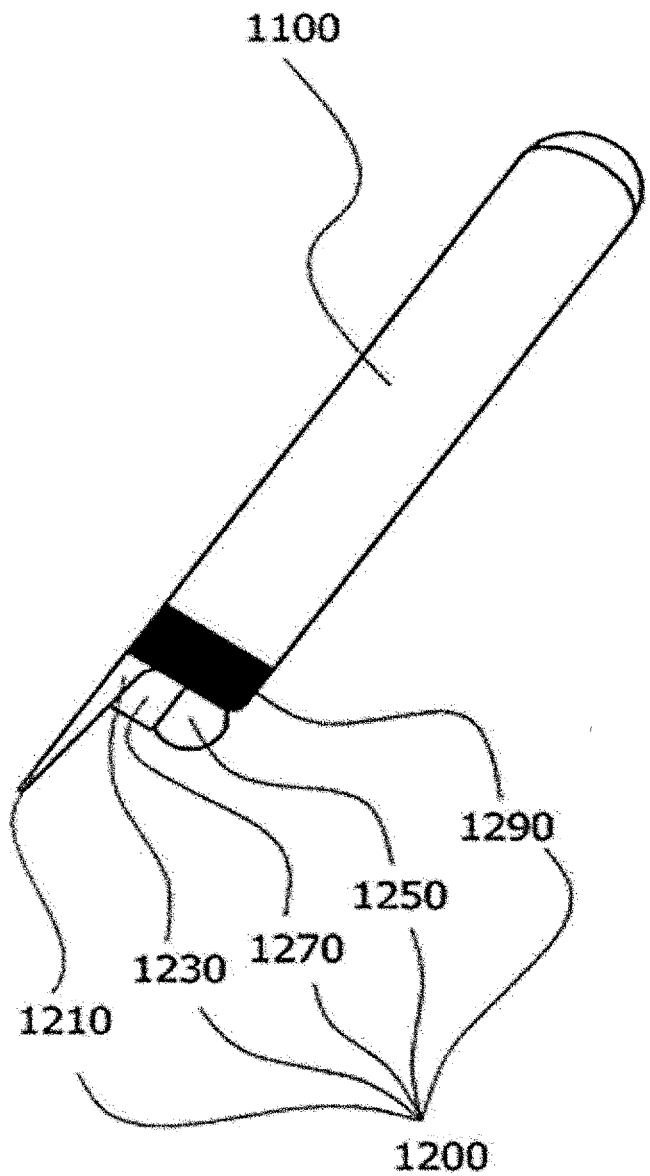
FIGS. 2 and 3 are diagrams illustrating a dot pattern recognizing device according to an exemplary embodiment of the present invention.
Figure 3:
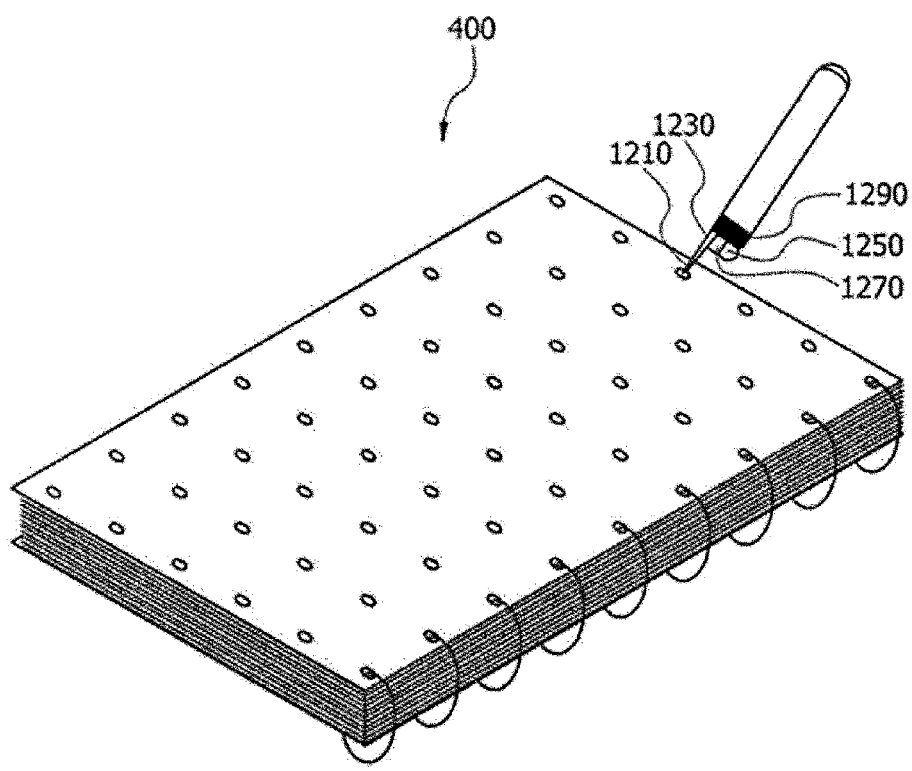

FIGS. 2 and 3 are diagrams illustrating the dot pattern recognizing device according to the exemplary embodiment of the present invention.

Referring to FIGS. 2 and 3, the dot pattern recognizing device 100 may be an electronic pen including a dot pattern recognizing function and a writing function. In this case, the dot pattern recognizing device 100 may include a body part 1100, and a writing part 1200 provided at one end of the body part 1100, and detecting pattern information on a recording medium on which a dot pattern is formed.

The body part 1100 may be formed of one among a composite resin of acrylonitrile butadiene styrene (ABS) copolymer and poly carbonate (PC), a synthetic resin, such as poly propylene (PP) and poly phenylene sulfide (PPS), a PMMA synthetic resin, a PS synthetic resin, glass, metallic species, and a mixture selected therefrom.

The body part 1100 may be formed to have the same diameter, a shape in which an upper end thereof is wide and a lower end thereof is narrow, or a shape in which an upper end thereof is narrow and a lower end thereof is wide, and covers (not illustrated) may be formed at both ends thereof.

The writing part 1200 may include a pen tip unit 1210 capable of performing writing on the recording medium 400, a pressure detecting sensor 1230 for generating information on pen pressure applied to the pen tip unit 1210, an infrared light source 1250 for outputting infrared light on the recording medium 400, an infrared light sensor 1270 for detecting infrared light scattered on the recording medium 400, and a detection unit 1290 for detecting pattern information by using the detected infrared light.

The pen tip unit 1210 may be formed in a nib shape protruding from one end of the body part 110 to the outside.

The pressure detecting sensor 1230 may be adjacent to the pen tip unit 1210, and detect a pressure applied to the pen tip unit 1210. When the pen tip unit 1210 is in contact with the recording medium 400, the pressure detecting sensor 1230 may calculate a pressure, which is proportional to force applied to the pen tip unit 1210, with a numerical value, and generate information on pen pressure.

When the pen tip unit 1210 is in contact with the recording medium 400 or is close to the recording medium 400 within a predetermined distance, the infrared light source 1250 transmits infrared light. In addition, the infrared light source 1250 may always transmit infrared light regardless of a distance from the recording medium 400.

The infrared light sensor 1270 is adjacent to the pen tip unit 1210, and detects infrared light scattered on the recording medium 400.

The detection unit 1290 detects a dot pattern on the recording medium 400 by using the infrared light detected by the infrared light sensor 1270.

In the meantime, the recording medium 400 may include a paper on which a dot pattern is printed. The recording medium 400 may be, for example, a book and a diary on which a dot pattern is printed.

The dot patterned formed on the recording medium according to the exemplary embodiment of the present invention will be described in detail with reference to FIGS. 4 and 5.

Figure 4:
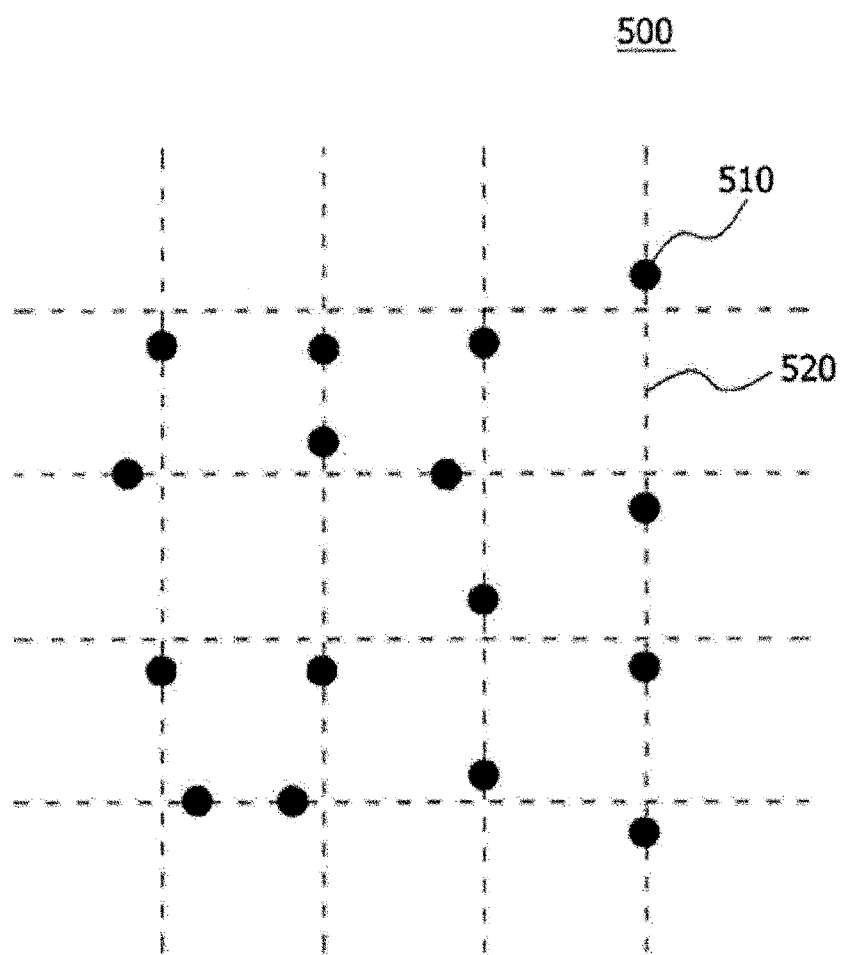
FIGS. 4 and 5 illustrate a dot pattern formed on a recording medium according to an exemplary embodiment of the present invention.

Referring to FIG. 4, a dot pattern 500 includes a virtual grid line 520 and a plurality of marks 510, and the respective marks 510 may be formed at a predetermined interval based on crossing points of the virtual grid lines 520. Each mark 510 may provide pattern information by a pattern value determined according to a position formed based on the crossing point of the virtual grid lines 520.

The mark 510 may be formed by using infrared ray absorption ink, for example, including one of a phthalocyanine-based compound, a naphthalocyanine-based compound, an aminium-based compound, and a mixture selected therefrom. Accordingly, the infrared light sensor 1270 may detect infrared light scattered at a portion in which the mark 510 is not formed, and when the detection unit 1290 recognizes the 36 marks 510, which is 6 by 6 square on the grid line 520 having a size of 6×6 by using the detected infrared light, the detection unit 1290 may calculate the pattern information according to values of the respective marks 510.

The marks 510 are formed at a predetermined interval based on the crossing points of the virtual grid line 520 to have the values of the respective marks 510, and the value of the mark 510 may be configured by a combination of two or more different values.

A shape of the mark 510 may have various shapes, such as a circular shape, an ellipsoidal shape, a polygonal shape, and a straight line.

Figure 5:
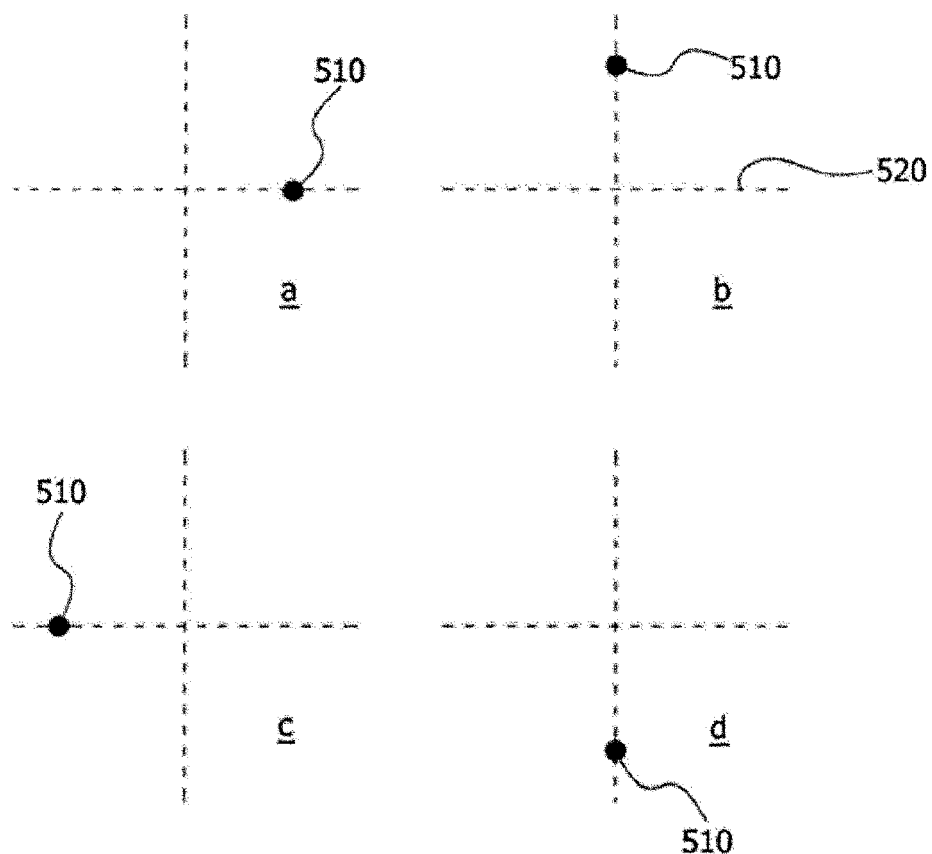

Referring to FIG. 5, the marks 510 may be present at four positions according to a relationship with the crossing points of the virtual grid line 520. When the mark 510 is positioned at a right side of the crossing point as indicated by "a", a value of the mark 510 may be indicated by "1", when the mark 510 is positioned at an upper end of the crossing point as indicated by "b", a value of the mark 510 may be indicated by "2", when the mark 510 is positioned at a left side of the crossing point as indicated by "c", a value of the mark 510 may be indicated by "3", and when the mark 510 is positioned at a lower end of the crossing point as indicated by "d", a value of the mark 510 is indicated by "4". As described above, it is possible to detect the pattern information according to the position of the mark 510 based on the crossing point of the virtual grid line 520.

Further, the marks 510 may be formed in a diagonal direction, not on the virtual grid line 520, and the plurality of marks 510 may be formed at the crossing points of one virtual grid lines 520 to provide location information. In this case, the value of each mark 510 may be indicated by predetermined coordinates by an x-y coordinate division method, and the pattern information may be provided by the value of the mark 510 indicated by the coordinates.

The virtual grid line 520 may be horizontally and vertically formed while having a predetermined interval. A distance in the grid line 520 may be formed to have 250 μm to 300 μm, and the mark 510 may be formed at a point distant by /1;4 to /1;8 of the distance from the crossing point of the virtual grid line 520. Otherwise, two or more marks 510 may be formed to be associated with each other based on the crossing point of the virtual grid line 520.

Here, it is described that the dot pattern recognizing device 100 is the electronic pen as an example, but the dot pattern recognizing device 100 is not limited thereto. The dot pattern recognizing device 100 may be all of the devices having the dot pattern recognizing function.

According to the exemplary embodiment of the present invention, the dot pattern recognizing device 100 may recognize the dot pattern in stages, and sequentially extract location information from the dot pattern recognized in stages.

Figure 6:
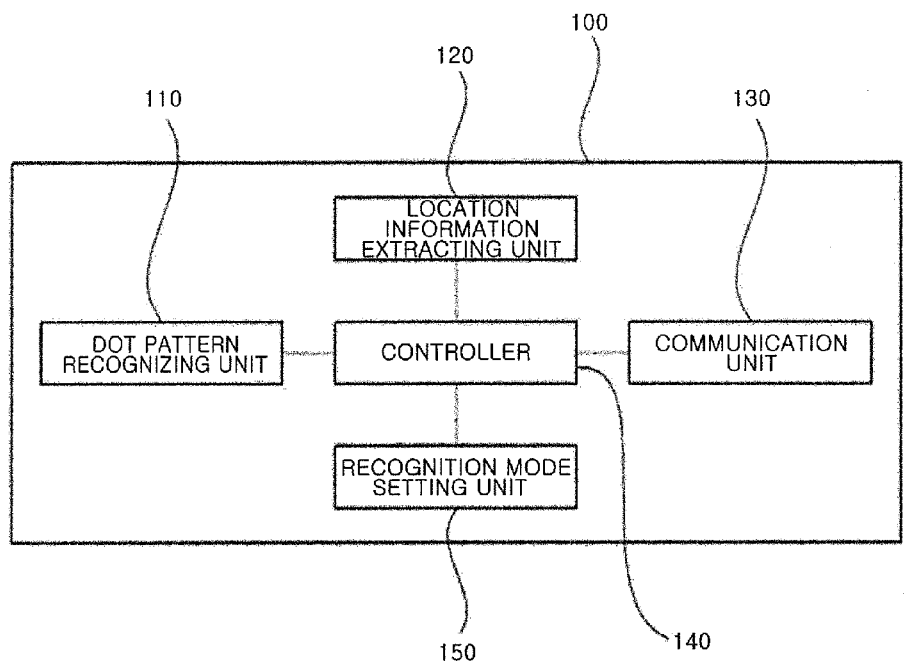
FIG. 6 is a block diagram of the dot pattern recognizing device according to the exemplary embodiment of the present invention.
Figure 7:
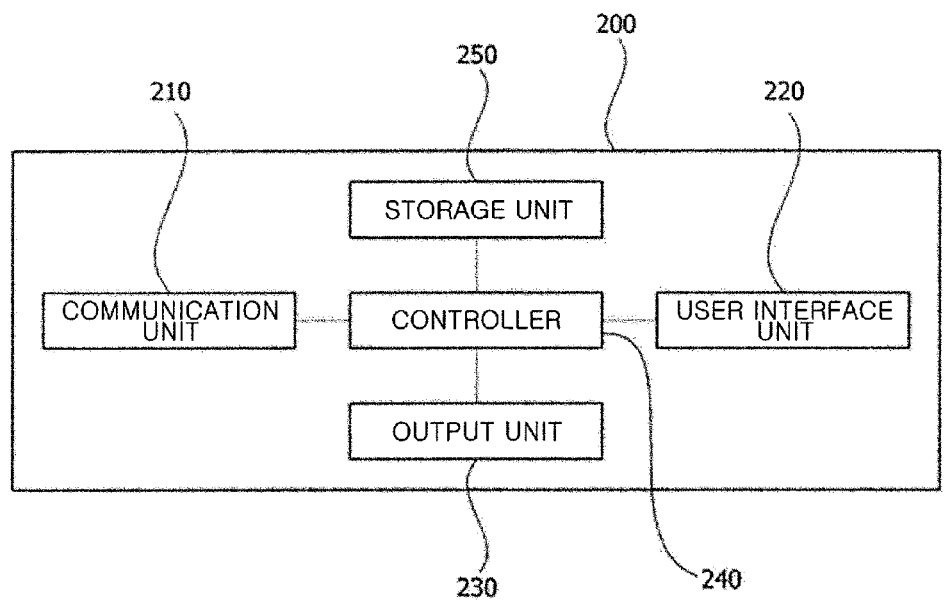
FIG. 7 is a block diagram of a content executing device according to the exemplary embodiment of the present invention.

FIG. 6 is a block diagram illustrating the dot pattern recognizing device according to the exemplary embodiment of the present invention, and FIG. 7 is a block diagram of a content executing device according to the exemplary embodiment of the present invention.

Referring to FIG. 6, the dot pattern recognizing device 100 includes a dot pattern recognizing unit 110, a location information extracting unit 120, a communication unit 130, a controller 140, and a recognition mode setting unit 150.

The dot pattern recognizing unit 110 recognizes a dot pattern on a recording medium, on which the dot pattern is formed, in stages. For example, the dot pattern recognizing unit 110 may recognize the dot pattern in the state where the dot pattern recognizing device 100 is spaced apart from the recording medium 400, and then recognize the dot pattern in the state where the dot pattern recognizing device 100 is in contact with the recording medium 400. Hereinafter, the dot pattern recognized in the state where the dot pattern recognizing device 100 is spaced apart from the recording medium 400 is referred to as a first dot pattern, and the dot pattern recognized in the state where the dot pattern recognizing device 100 is in contact with the recording medium 400 is referred to as a second dot pattern.

The dot pattern recognizing unit 110 may include the infrared light source 1250, the infrared light sensor 1270, and the detection unit 1290 of FIG. 2.

The location information extracting unit 120 sequentially extracts location information from the dot pattern recognized by the dot pattern recognizing unit 110 in stages. For example, the location information extracting unit 120 may extract the location information according to the method described with reference to FIGS. 4 and 5.

The communication unit 130 transmits the extracted location information to the content executing device 200 wirelessly or by wire. In this case, the communication unit 130 may transmit the location information according to the sequence of the extraction performed by the location information extracting unit 120.

In this case, the dot pattern recognizing unit 110 may recognize the dot pattern in the state where the dot pattern recognizing device 100 is spaced apart from the recording medium 400, extract the location information from the recognized dot pattern, and transmit the extracted location information to the content executing device 200. Then, the dot pattern recognizing unit 110 may recognize the dot pattern in the state where the dot pattern recognizing device 100 is in contact with the recording medium 400, extract the location information from the recognized dot pattern, and transmit the extracted location information to the content executing device 200.

The controller 140 generally controls the dot pattern recognizing device 100 including the dot pattern recognizing unit 110, the location information extracting unit 120, the communication unit 130, and the like.

In the meantime, the dot pattern recognizing device 100 may further include the recognition mode setting unit 150 for setting a dot pattern recognition mode of the dot pattern recognizing unit 110. The recognition mode setting unit 150 may set the dot pattern recognizing device 100 so that the dot pattern recognizing device 100 is operated in a first recognition mode in which a dot pattern is recognized only when the dot pattern recognizing device 100 is in contact with the recording medium 400, or in a second recognition mode in which a dot pattern is recognized in both the cases where the dot pattern recognizing device 100 is spaced apart from the recording medium 400 and where the dot pattern recognizing device 100 is in contact with the recording medium 400. The recognition mode may be selected by a user, or automatically set according to the amount of charge of a battery left in the dot pattern recognizing device 100, a movement speed of the dot pattern recognizing device 100, or the like. To this end, the dot pattern recognizing device 100 may further include a user interface unit for selecting a recognition mode, a battery sensor, a speed sensor, and an acceleration sensor. For example, when the user interface unit (not illustrated), which is further included in the dot pattern recognizing device 100, is used, the user may set the dot pattern recognizing device 100 so that the dot pattern recognizing device 100 is operated in one of the first recognition mode and the second recognition mode.

Otherwise, when the amount of charge of the battery left in the dot pattern recognizing device 100 is equal to or greater than a predetermined value, the recognition mode setting unit 150 may set the dot pattern recognizing device 100 so that the dot pattern recognizing device 100 is operated in the second recognition mode, and when the amount of charge of the battery left in the dot pattern recognizing device 100 is smaller than the predetermined value, the recognition mode setting unit 150 may set the dot pattern recognizing device 100 so that the dot pattern recognizing device 100 is operated in the first recognition mode. In this case, the amount of charge of the battery left in the dot pattern recognizing device 100 may be detected by the battery sensor (not illustrated) further included in the dot pattern recognizing device 100, and the predetermined value serving as the reference for the recognition mode setting may be pre-set or be selected by the user.

Otherwise, when the movement speed of the dot pattern recognizing device 100 is equal to or greater than a predetermined value, the recognition mode setting unit 150 may set the dot pattern recognizing device 100 so that the dot pattern recognizing device 100 is operated in the second recognition mode, and when the movement speed of the dot pattern recognizing device 100 is smaller than the predetermined value, the recognition mode setting unit 150 may set the dot pattern recognizing device 100 so that the dot pattern recognizing device 100 is operated in the first recognition mode. Accordingly, when the user shakes the dot pattern recognizing device 100 at a fast speed, the dot pattern recognizing device 100 may be operated in the second recognition mode. In this case, the movement speed of the dot pattern recognizing device 100 may be detected by the speed sensor or the acceleration sensor further included in the dot pattern recognizing device 100, and the predetermined value serving as the reference for the recognition mode setting may be pre-set or be selected by the user.

Otherwise, when the movement speed of the dot pattern recognizing device 100 is equal to or greater than a predetermined value, the recognition mode setting unit 150 may change the recognition mode of the dot pattern recognizing device 100. For example, when the user shakes the dot pattern recognizing device 100 at a fast speed in the state where the dot pattern recognizing device 100 is operated in the first recognition mode, the recognition mode setting unit 150 may change the recognition mode of the dot pattern recognizing device 100 to the second recognition mode. By contrast, when the user shakes the dot pattern recognizing device 100 at a fast speed in the state where the dot pattern recognizing device 100 is operated in the second recognition mode, the recognition mode setting unit 150 may change the recognition mode of the dot pattern recognizing device 100 to the first recognition mode.

Otherwise, the recognition mode setting unit 150 may change the recognition mode according to the type of the recognized dot pattern. When a dot pattern corresponding to a specific region is recognized, the recognition mode of the dot pattern recognizing device 100 may be automatically switched to the first recognition mode, and when a dot pattern corresponding to another specific region is recognized during use, the first recognition mode may be changed to the second recognition mode.

Referring to FIG. 7, the content executing device 200 may be a device, such as a personal computer (PC), a notebook computer (laptop computer), a smart phone, and a tablet PC, including a function for executing contents.

The content executing device 200 includes a communication unit 210, a user interface unit 220, an output unit 230, a controller 240, and a storage unit 250. However, all of the illustrated constituent elements are not essential constituent elements. The content executing device may be implemented by more or less constituent elements than the illustrated constituent elements.

The communication unit 210 may include a mobile communication module, a wireless Internet module, a Bluetooth module, and the like, and the entirety or some of the modules may be integrated into one module.

The mobile communication module transceives a wireless signal with at least one of a base station, an external terminal, and a server through a mobile communication network. The wireless signal may include a voice call signal, a video call signal, or data in various forms according to the transmission and reception of text/multimedia messages.

The wireless Internet module refers to a module for wireless Internet access, and may be embedded or externally installed. Wireless local area network (WLAN) (i.e., Wi-Fi), wireless broadband (Wibro), world interoperability for microwave access (Wimax), high speed downlink packet access (HSDPA), and the like may be used as wireless Internet technology.

The user interface unit 220 receives data or information for controlling an operation of a terminal from the user. The user interface unit 220 may be a keypad, a dome switch, a touch pad (static pressure/capacitive), a jog wheel, a jog switch, a microphone, and the like.

The output unit 230 displays information processed by the user terminal 200 to the user as various types of signals (for example, a sound signal and a visual signal). The output unit 230 may be, for example, a liquid crystal display (LCD), a light emission diode (LED) display, an organic light emission diode (OLED) display, a speaker, and the like.

The controller 240 controls the general operation of the user terminal 200.

The storage unit 250 stores a program for an operation of the controller 240, and temporarily stores input/output data. The content executing device 200 may also be operated in connection with a web storage which performs a storage function of the storage unit 250 on the Internet.

The communication unit 210 sequentially receives the location information which is recognized from the recording medium, on which the dot pattern is formed, in stages and extracted by the dot pattern recognizing device 100. Further, the communication unit 210 requests contents from the content storing server 300, and receives the contents from the content storing server 300.

Further, the controller 240 executes the function or the contents corresponding to the received location information.

Further, the output unit 230 outputs the executed function.

In the meantime, the storage unit 250 may store the location information and content information corresponding to the location information. Here, the content information may include identification information about the contents, location information within the contents, function information for executing the contents, and the like. The storage unit 250 may further store the contents itself. When the storage unit 250 stores the contents itself, the storage unit 250 may be autonomously operated without association with the external content storing server 300.

Figure 8:
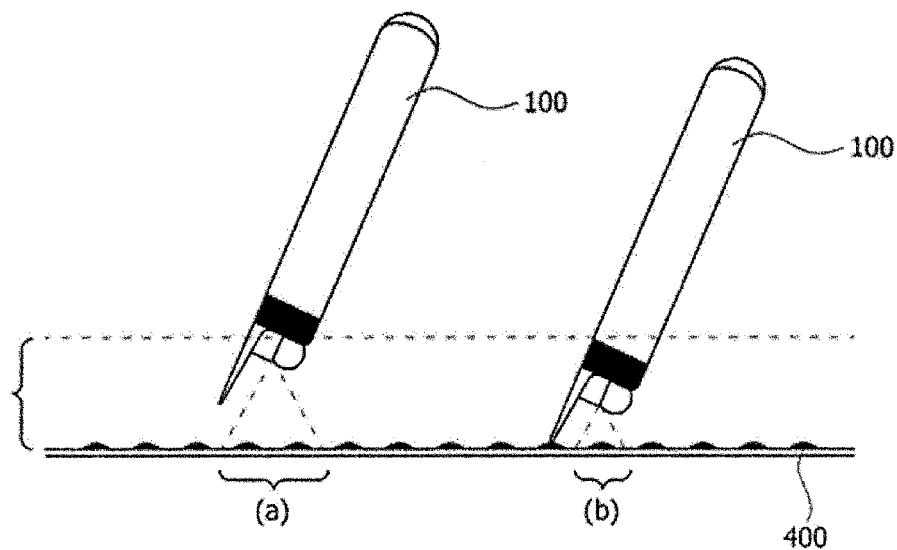
FIG. 8 illustrates an example of recognition of a dot pattern in stages by the dot pattern recognizing device according to the exemplary embodiment of the present invention.
Figure 9:
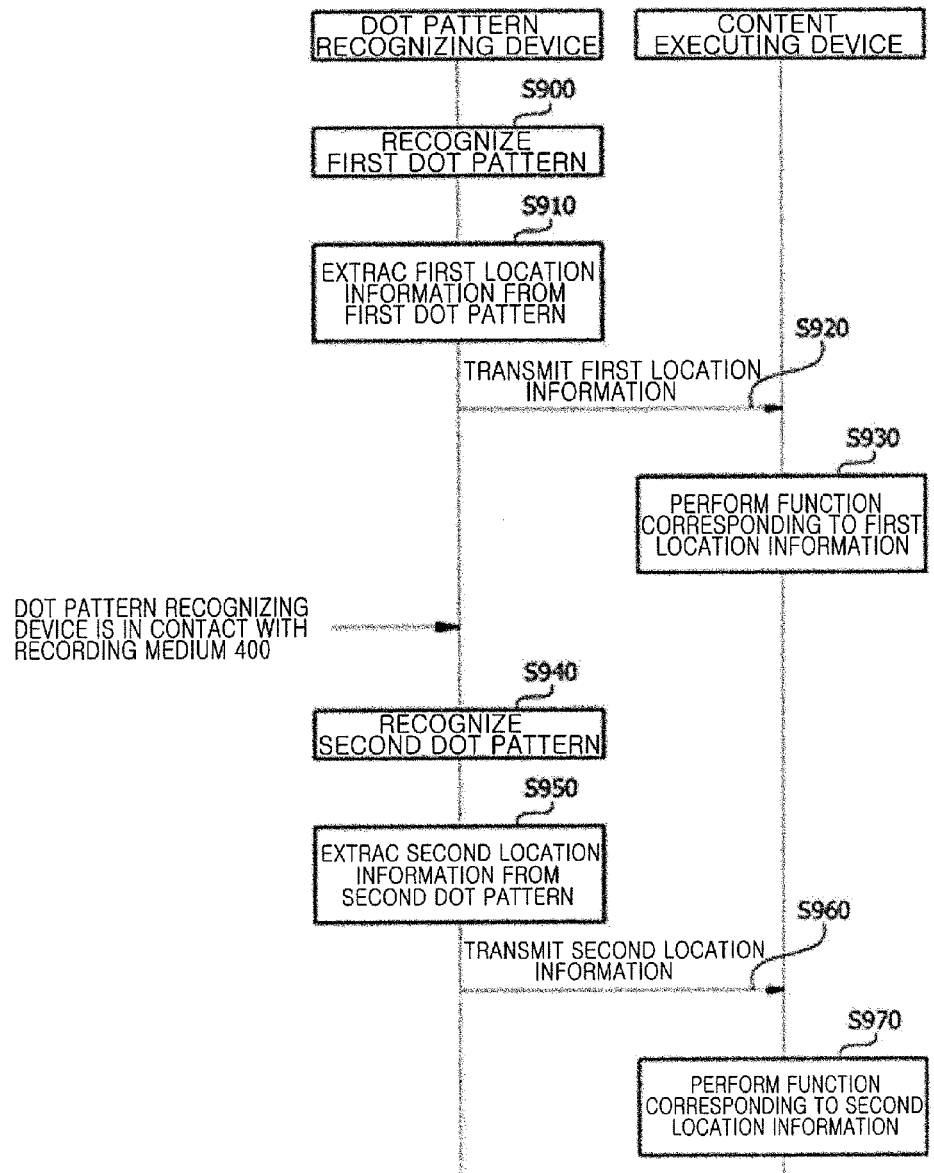
FIG. 9 is a flowchart illustrating a content executing method in the exemplary embodiment of FIG. 8.

FIG. 8 illustrates an example of recognition of a dot pattern in stages by the dot pattern recognizing device according to the exemplary embodiment of the present invention, and FIG. 9 is a flowchart illustrating a content executing method in the exemplary embodiment of FIG. 8.

Referring to FIGS. 8 and 9, the dot pattern recognizing device 100 recognizes a first dot pattern in the state where the dot pattern recognizing device 100 is spaced apart from the recording medium 400 (S900), extracts first location information from the first dot pattern (S910), and transmits the extracted first location information to the content executing device 200 (S920). Accordingly, the content executing device 200 performs a function corresponding to the first location information (S930). In this case, when the dot pattern recognizing device 100 moves, the dot pattern recognizing device 100 may continuously extract the first location information from the recognized first dot pattern while moving, and the content executing device 200 may perform a function corresponding the first location information based on the continuously received first location information.

Further, the dot pattern recognizing device 100 recognizes a second dot pattern in the state where the dot pattern recognizing device 100 is in contact with the recording medium 400 (S940), extracts second location information from the second dot pattern (S950), and transmits the extracted second location information to the content executing device 200 (S960). Accordingly, the content executing device 200 performs a function corresponding to the second location information (S970). In this case, when the dot pattern recognizing device 100 moves, the dot pattern recognizing device 100 may continuously extract the second location information from the recognized second dot pattern while moving, and the content executing device 200 may perform a function corresponding to the second location information based on the continuously received second location information.

Here, the function corresponding to the first location information and the function corresponding to the second location information may be the same. For example, when the dot pattern recognizing device 100 extracts location information from the dot pattern recognized in the state where the dot pattern recognizing device 100 is spaced apart from the recording medium 400, that is, before the dot pattern recognizing device 100 is in contact with the recording medium 400, and then transmits the extracted location information to the content executing device 200, a time up to when the dot pattern recognizing device 100 is in contact with the recording medium 400 may be reduced, so that a reaction speed of the content executing device 200 may be decreased.

Particularly, a range (a) of the dot pattern recognized in the state where the dot pattern recognizing device 100 is spaced apart from the recording medium 400 may be wider than a range (b) of the dot pattern recognized in the state where the dot pattern recognizing device 100 is in contact with the recording medium 400. Accordingly, the dot pattern recognizing device 100 recognizes an approximate location on the recording medium 400 from the first location information, and then recognizes an accurate location from the second location information, so that it is possible to rapidly and accurately execute the contents.

In the meantime, the function corresponding to the first location information and the function corresponding to the second location information may be different from each other. In this case, the first location information may be location information about the dot pattern recognized in the state where the dot pattern recognizing device 100 is spaced apart from the recording medium 400, and the second location information may be location information about the dot pattern recognized in the state where the dot pattern recognizing device 100 is in contact with the same region as the region in which the first location information is recognized. For example, the function corresponding to the first location information may be a function for designating and displaying a page within the contents, and the function corresponding to the second location information may be a specific function (for example, an audio output function, an image output function, a video output function, and the like) for a corresponding region within a displayed page. Accordingly, when the dot pattern recognizing device 100 recognizes the dot pattern while being spaced apart from the recording medium 400, the content executing device 200 may display a corresponding page, and when the dot pattern recognizing device 100 is in contact with the recording medium 400, the content executing device 200 may output audio for the corresponding page.

For another example, the function corresponding to the first location information is a function for driving and displaying a character flash file, and the function corresponding to the second location information may be a function for driving an audio file. Accordingly, when the dot pattern recognizing device 100 recognizes the dot pattern while being spaced apart from the recording medium 400, the content executing device 200 may display only a character flash, and when the dot pattern recognizing device 100 is in contact with the recording medium 400, the content executing device 200 may output audio.

In the meantime, the recording medium 400 may include a plurality of regions which are divided in parallel, and a plurality of functions may be allocated to each region.

Figure 10:
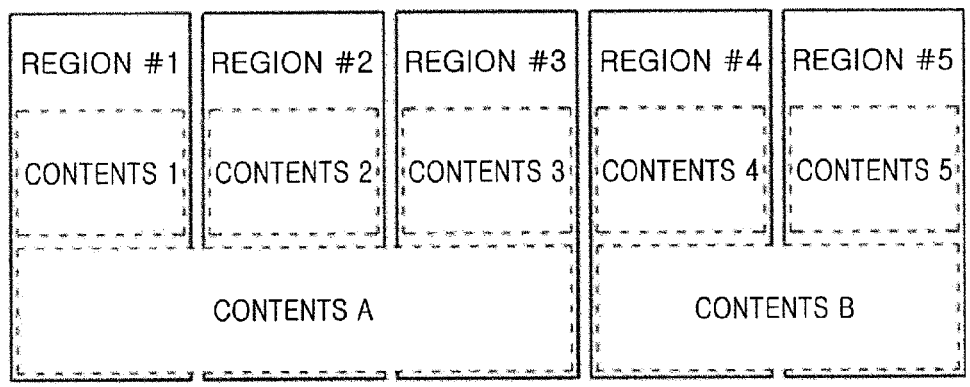
FIG. 10 illustrates a plurality of functions allocated for each region of a recording medium according to the exemplary embodiment of the present invention.

FIG. 10 illustrates a plurality of functions allocated to regions of the recording medium 400, respectively, according to the exemplary embodiment of the present invention.

Referring to FIG. 10, the recording medium 400 includes a plurality of regions (for example, region #1, region #2, region #3, region #4, and region #5) which are divided in parallel, and a plurality of functions may be allocated to each region. In this case, at least some of the functions allocated to each region, may be different from the function allocated to another region. Further, at least some of the functions allocated to each region, may be the same as the function allocated to another region.

For example, functions of contents 1 and contents A may be allocated to region #1, functions of contents 2 and contents A may be allocated to region #2, and functions of contents 3 and contents A may be allocated to region #3. Further, functions of contents 4 and contents B may be allocated to region #4, and functions of contents 5 and contents B may be allocated to region #5.

As described above, the functions of contents 1 to contents 5, which are different functions from each other, may be allocated to regions #1 to #5, and contents A may be identically allocated to regions #1 to #3, and contents B may be identically allocated to regions #4 and #5. Hereinafter, for convenience of the description, the present invention will be described based on an example in which contents 1 to 5 are audio contents, and contents A and B are image contents.

As one exemplary embodiment, when the dot pattern recognizing device 100 recognizes a dot pattern in a predetermined region while being spaced apart from the recording medium 400 or being in contact with the recording medium 400, a plurality of contents allocated to the corresponding region may be simultaneously executed. That is, when the dot pattern recognizing device 100 recognizes the dot pattern of region #1 in the state where the dot pattern recognizing device 100 is spaced apart from the recording medium 400, the content executing device 200 may display an image for contents A while outputting audio for contents 1. Further, when the dot pattern recognizing device 100 recognizes the dot pattern of region #3 in the state where the dot pattern recognizing device 100 is in contact with the recording medium 400, the content executing device 200 may display an image for contents A while outputting audio for contents 3.

As another exemplary embodiment, the dot pattern recognizing device 100 may recognize a dot pattern in a predetermined region in stages, and a plurality of contents allocated to the corresponding region may be executed in stages. For example, when the dot pattern recognizing device 100 recognizes the dot pattern of region #1 in the state where the dot pattern recognizing device 100 is spaced apart from the recording medium 400, the content executing device 200 may display an image for contents A, and when the dot pattern recognizing device 100 recognizes the dot pattern of region #1 in the state where the dot pattern recognizing device 100 is in contact with the recording medium 400, the content executing device 200 may output audio for contents 1. For another example, the dot pattern recognizing device 100 is in contact with region #1 of the recording medium 400, and simultaneously the content executing device 200 displays an image for contents A, and when a predetermined time elapses after the dot pattern recognizing device 100 is in contact with region #1 of the recording medium 400, the content executing device 200 may output audio for contents 1.

As described above, when the region of the recording medium 400 is divided in parallel, and the plurality of functions is allocated to each region, the plurality of functions may be simply executed. That is, when the region of the recording medium 400 is hierarchically divided, and a function is allocated for each layer, a procedure for determining whether the recognized dot pattern is a higher layer dot pattern or a lower layer dot pattern is necessary. However, when the region of the recording medium 400 is divided in parallel according to the exemplary embodiment of the present invention, it is not necessary to determine a layer, thereby reducing a processing time.

A term "~ unit" used in the present exemplary embodiment means a software constituent element or a hardware constituent element, such as field-programmable gate array (FPGA) or an application specific integrated circuit (ASIC), and a "~ unit" performs specific functions. However, the "~ unit" is not limited to software or hardware. A "~ unit" may be configured to be included in an addressable storage medium, and to operate one or more processors. Accordingly, examples of the "~ unit" includes constituent elements, such as software constituent elements, object-oriented software constituent elements, class constituent elements, and task constituent elements, processes, functions, attributes, procedures, subroutines, segments of a program code, drivers, firmware, a microcode, a circuit, data, database, data structures, tables, arrays, and variables. The constituent elements and functions provided by the "~ units" may be combined into the less number of constituent elements and the "~ units" or be further separated into additional constituent elements and "~ units". In addition, the constituent elements and the "~ units" may be implemented so as to operate one or more CPUs within a device or a security multimedia card.

The present invention has been described with reference to the exemplary embodiment, but those skilled in the art may understand that the present invention may be variously modified and changed within the scope without departing from the spirit and the area of the present invention described in the accompanying claims.

What is claimed is:
1. A device for recognizing a dot pattern, comprising:
   a dot pattern recognizing unit configured to recognize a first dot pattern and a second dot pattern on a recording medium, on which a dot pattern is formed, in stages;
   a location information extracting unit configured to extract first location information from the first dot pattern, and then extract second location information from the second dot pattern;
   a communication unit configured to transmit the first location information to a content executing device, and then transmit the second location information to the content executing device;
   a recognition mode setting unit configured to set the device so that the device is operated in a first recognition mode set to recognize only the second dot pattern according to the amount of charge left in a battery, or in a second recognition mode set to recognize the first dot pattern and the second dot pattern; and a controller configured to control the dot pattern recognizing unit, the location information extracting unit, the communication unit, and the recognition mode setting unit, wherein the first dot pattern is a dot pattern recognized when the device is spaced apart from the recording medium, and the second dot pattern is a dot pattern recognized when the device is in contact with the recording medium.

2. A system for executing contents, comprising:

a dot pattern recognizing device configured to recognize a first dot pattern and a second dot pattern on a recording medium, on which a dot pattern is formed, in stages, extract first location information from the first dot pattern, and then extract second location information from the second dot pattern, transmit the first location information to a content executing device, and then transmit the second location information to the content executing device, and set the device so that the device is operated in a first recognition mode set to recognize only the second dot pattern according to the amount of charge left in a battery, or in a second recognition mode set to recognize the first dot pattern and the second dot pattern; and a content executing device configured to receive the first location information from the dot pattern recognizing device, receive the second location information, execute functions corresponding to the first location information and the second location information in stages, and output the executed function, wherein the first dot pattern is a dot pattern recognized when the device is spaced apart from the recording medium, and the second dot pattern is a dot pattern recognized when the device is in contact with the recording medium.

3. The system of claim 2, wherein the first location information and the second location information correspond to the same function.

4. The system of claim 2, wherein the first location information and the second location information correspond to different functions.

5. The system of claim 2, wherein the recording medium includes a plurality of regions divided in parallel, and a plurality of functions is allocated to each region.

6. The system of claim 5, wherein when the first location information for a predetermined region is received from the dot pattern recognizing device, the plurality of functions allocated to the predetermined region is executed.

7. The system of claim 5, wherein when the second location information for a predetermined region is received from the dot pattern recognizing device, the plurality of functions allocated to the predetermined region is executed.

8. The system of claim 5, wherein when the first location information for a predetermined region is received from the dot pattern recognizing device, at least some of the plurality of functions allocated to the predetermined region is executed, and when the second location information for the predetermined region is received, the rest of the plurality of functions allocated to the predetermined region is executed.

* * * * *